C. W. STEELE.
MACHINE FOR MANUFACTURING ARTICLES OF RUBBER AND FABRIC.
APPLICATION FILED APR. 18, 1919.

1,366,969.

Patented Feb. 1, 1921.
8 SHEETS—SHEET 5.

C. W. STEELE.
MACHINE FOR MANUFACTURING ARTICLES OF RUBBER AND FABRIC.
APPLICATION FILED APR. 18, 1919.

1,366,969.

Patented Feb. 1, 1921.
8 SHEETS—SHEET 6.

UNITED STATES PATENT OFFICE.

CHARLES W. STEELE, OF AKRON, OHIO, ASSIGNOR TO THE FIRESTONE TIRE AND RUBBER COMPANY, OF AKRON, OHIO, A CORPORATION OF OHIO.

MACHINE FOR MANUFACTURING ARTICLES OF RUBBER AND FABRIC.

1,366,969.    Specification of Letters Patent.    Patented Feb. 1, 1921.

Application filed April 18, 1919. Serial No. 290,982.

*To all whom it may concern:*

Be it known that I, CHARLES W. STEELE, a citizen of the United States, residing at Akron, in the county of Summit, State of Ohio, have invented new and useful Improvements in Machines for Manufacturing Articles of Rubber and Fabric, of which the following is a full, clear, and exact description.

This invention relates to a machine for the manufacture of articles made from a plurality of layers or plies of material, particularly fabric and rubber, or rubberized fabric, and the purpose is to construct a machine which will quickly and effectively form articles of this type directly from rolls of material without necessity for any manual operations whatever.

More particularly the machine shown herein is constructed and designed for the manufacture of "blow-out patches" or shields of fabric and rubber which are designed to be placed in a tire which has blown out to afford a temporary patch for the tire.

This article is made, usually, of a plurality of pieces of rubberized fabric, the first and last of which are oval in shape, the intermediate pieces being rectangular and of differing sizes built up in the form of a pyramid. As each of the several plies are laid up, the patch is passed between squeeze rolls which compress it into form.

It will be understood that the machine herein shown is not necessarily limited to the manufacture of this type or form of patch, nor is it limited to patches at all, but may be adapted for a variety of purposes. Changes and modifications may be made within the scope of the invention without sacrificing any of its benefits.

In the drawings accompanying this application.

Figure 1:
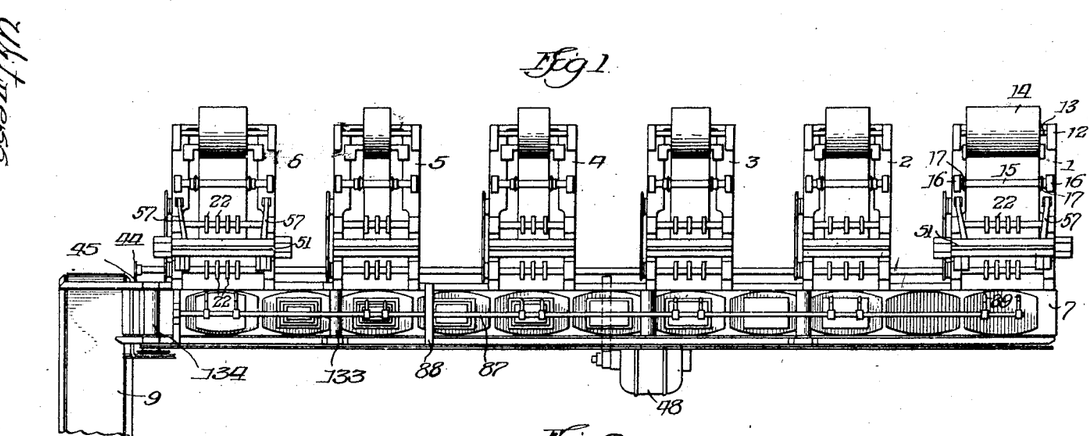
Figure 1 is a plan view of the entire machine for building up a blow-out patch of a plurality of layers.

As will be apparent by an inspection of Fig. 1, the patch is built up of a plurality of layers, which are usually rubberized fabric, the first, or foundation layer, being approximately oval-shaped, followed by a plurality of layers of rectangular fabric stacked in pyramid form and a cover layer similar in shape to the first layer but not quite as large. After the second layer has been applied and after each successive layer thereafter, the patch is rolled to effect a close union between the several layers. When the patch has been completely laid up, it is fed onto a delivery conveyer and is ready for vulcanizing.

Heretofore, to the best of my information, these patches have been made by hand, and it is my belief that in eliminating the hand operation, a quicker and better job will be performed.

Figure 2:
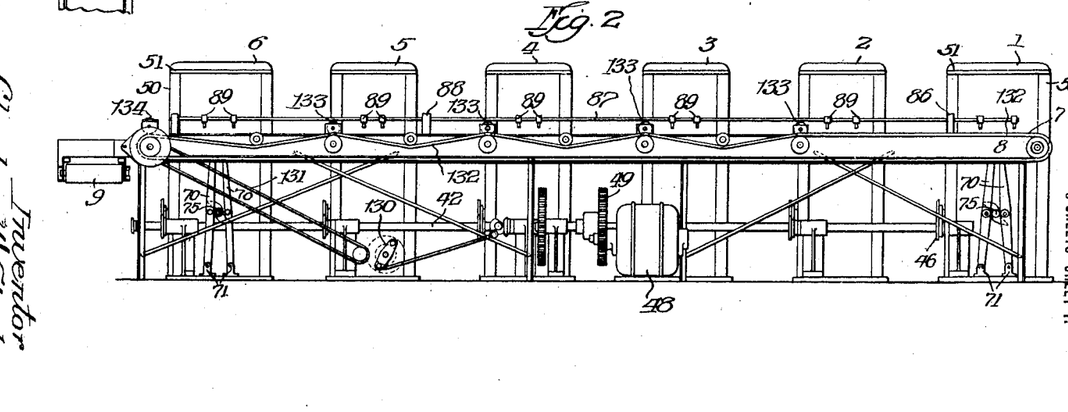
Fig. 2 is a side elevation of Fig. 1.

The machine comprises a series of units designated from right to left on Figs. 1 and 2 as 1 to 6 inclusive, which are designed to cut and deliver the several plies of rubberized fabric, units 1 and 6 being intended to cut oval or barrel-shaped outside layers.

The units mentioned deliver the cut pieces to an assembling conveyer 7 mounted on a table 8 extending across the several units and delivering the finished patch to a conveyer 9.

The units 1 and 6 are alike in all respects, except as to size and only one unit, No. 1, will be described.

Figure 3:
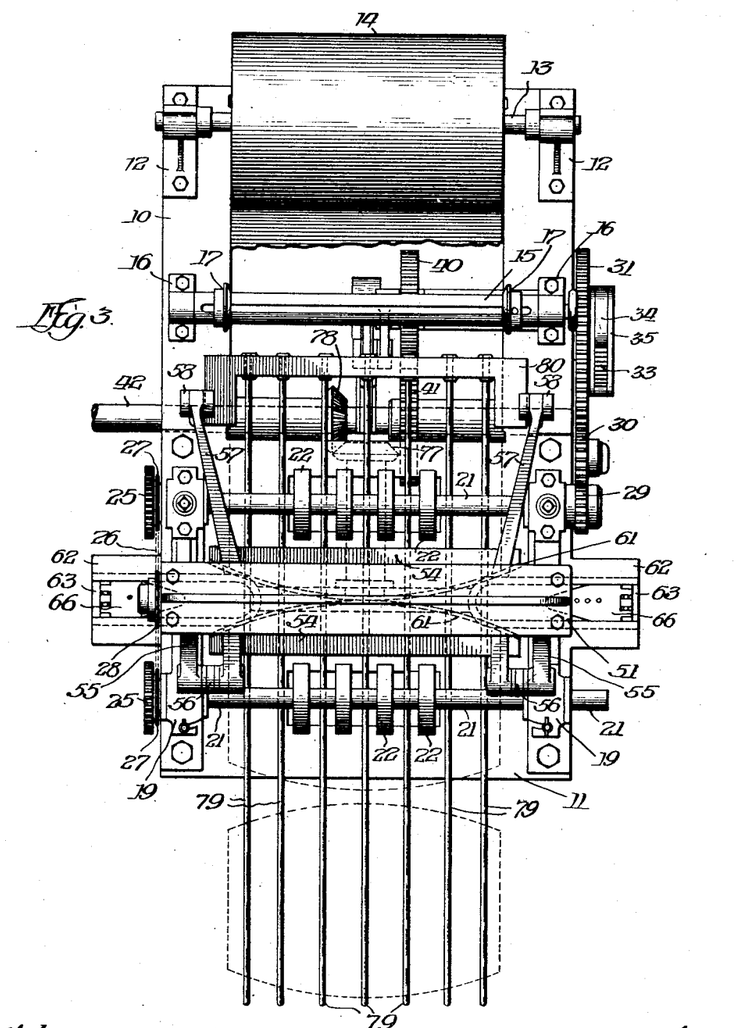
Fig. 3 is a plan view of one of the units for cutting out and feeding the first oval-shaped piece of rubberized fabric.
Figure 4:
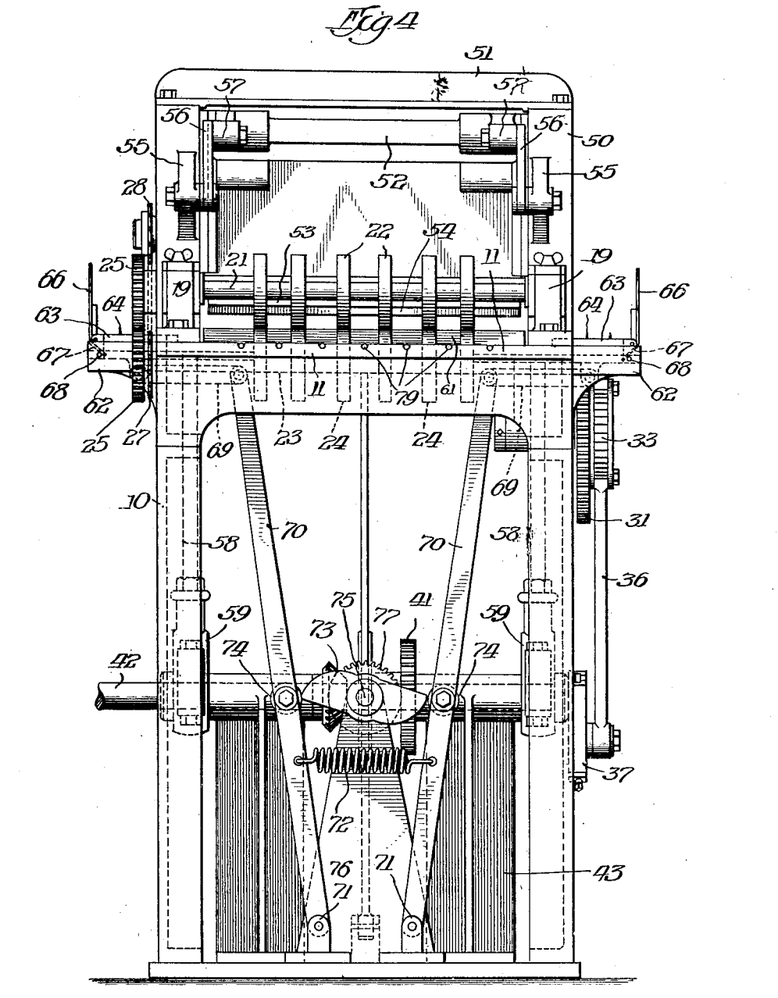
Fig. 4 is a front view of the same.
Figure 5:
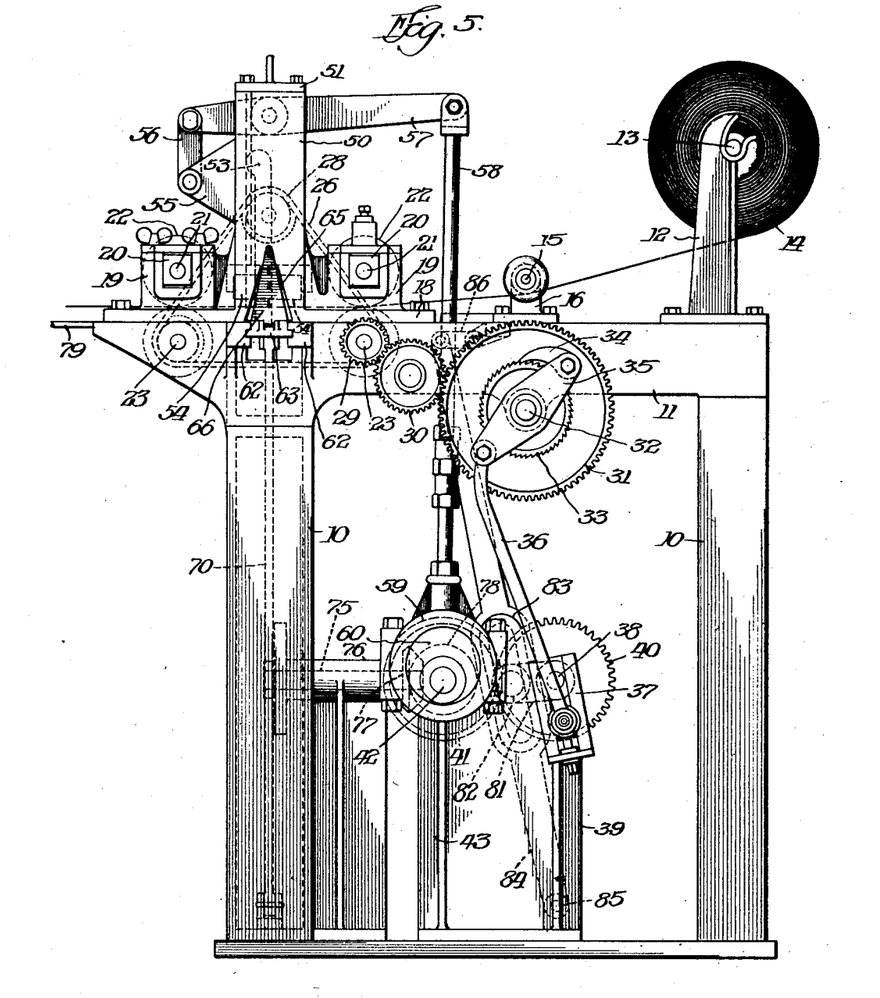
Fig. 5 is a side elevation.

This unit is shown in detail in Figs. 3, 4, and 5 and comprises a frame work 10 which supports a table 11, on which the cutting operations are performed. At the rear end of the table are supported a pair of uprights 12, the upper ends of which carry the shaft 13 of a fabric roll 14, from which the plies are cut. From the roll 14, the fabric passes under a shaft 15 supported on lugs 16, along which are slidably mounted a pair of guiding collars 17, which may be adjusted to center the fabric, any suitable form of adjusting means being provided.

On the forward end of the table is supported a plate or bridge piece 18, at the corners of which are formed bearings 19 in which are adjustably mounted journal boxes 20 supporting shafts 21 carrying a plurality of narrow pressure rollers 22. Below the shafts 21 is supported, in the table 11, a pair of shafts 23 which carry feeding rollers 24 beneath the rollers 22. The shafts 21 and 23 are interconnected by gearing 25 and are driven in unison by a sprocket chain 26, passing over sprocket wheels 27 on the shaft 23 and an idler sprocket 28. One of the shafts 23 carries a pinion 29, meshing with an idler pinion 30, connected to a large gear 31 rotatably supported on the table 11 at 32.

United to the gear 31 is a ratchet wheel 33 over which oscillates a pawl 34 carried on a rocking arm 35 pivoted on 32 and operated by a link 36, the lower end of which is adjustably secured to a crank 37 on the end of a rotating shaft 38, which is supported in uprights 39. Midway of the shaft 38 is a gear wheel 40 in mesh with a second gear 41 secured on a shaft 42 located in uprights 43. The shaft 42 constitutes the main drive shaft of the machine and extends the entire length of the machine, and at the left hand end carries a sprocket 44 over which is extended a chain 45 in mesh with a sprocket 46 on a counter shaft 47, extending under the assembly conveyer. Power is derived from a motor 48 through the intermediate gearing 49 shown in Fig. 6.

From the plate 18 arise two central uprights 50 joined by a cross head 51. Slidably mounted in the uprights is a reciprocating cross head 52 in the lower end of which is pivotally mounted a die block carrier 53 in the under side of which is secured a die block 54. The pivotal arrangement of the carrier is to permit replacement of the die block. From the sides of the uprights 50 extend a pair of lugs 55, which support links 56 in the ends of which are pivotally mounted levers 57. The ends of the levers are connected to vertical adjustable slide rods 58, which reciprocate in the frame and carry on their lower ends eccentric straps 59 which surround eccentrics 60 located on the shaft 42.

Set in the table 18 underneath the die block is a die 61, the shape of which is shown in Fig. 3, and over which the fabric is drawn the length desired for a single cut by the intermittently operating rollers 22 and 24. Between each feeding stroke of the pawl 34 and feed rollers, the die block descends and cuts off the first layer of fabric as shown in Fig. 3.

It will be noted that as the several pieces are cut out there are present two approximately triangular pieces of scrap to discharge which is one of the functions of this machine, being embodied in a pair of scrap discharging elements which will now be described.

In line with the die is a pair of guide ways 62 in which are arranged to be reciprocated a pair of slides 63 brought to a rounded formation at their inner ends approximately the shape of the scrap. On the upper side of the slides or scrap dischargers is a plurality of pins 64. These slides are arranged to be moved to their innermost position between the converging blades of the knife as the die block is brought against the knife. This action serves to force the pieces of scrap over the pins 64 and, upon the upward movement of the die block, the two pieces of scrap are withdrawn toward the side of the machine, the uprights 50 being apertured as at 65 to permit this movement.

To strip the scrap from the pins, there is provided on the outer end of each slide a pivoted stripper plate 66 which is perforated to permit the passage of the pins and which, when the slide is moved from its outermost position, lies on top of the slide and under the fabric. The stripper is provided with a tail piece 67 which will strike a pin 68 in the end of each guideway, raising the stripper to the position shown in Fig. 4 to discharge the scrap. Baskets to catch the scrap may be put at convenient locations.

It will be seen that by the mechanism described there is provided a convenient and easily operable means for removing and disposing of the scrap as it is cut from the fabric.

The mechanism for moving the scrap grippers to and fro consists of a pair of links 69 pivotally connected to the bottom of the slides at one end and to a pair of rocking levers 70, which are pivoted to lugs 71 secured to the framework, and are drawn together by a coil spring 72. The levers 70 are rocked at the proper time to discharge the scrap by a double cam 73 arranged to strike rollers 74 on the levers 70, which cam is mounted on a jack-shaft 75 supported in bearings 76 on the machine and rotated by a bevel pinion 77 in mesh with a bevel pinion 78 on the shaft 42.

After the first plies are cut out they are fed forward by the outer pair of rolls and drop on a set of rods or fingers 79 by which they are delivered to the assembly conveyer.

This delivery mechanism comprises a yoke 80 arranged to slide on the table, the several rods being secured to the yoke and passing under the knife or die block. The delivery pins are reciprocated by means of a crank 81 carried on the shaft 38, the crank pin 82 being received in a slot 83 located midway in a lever 84 which is pivoted on the framework at 85, and connected to the yoke 80 by a short link 86 (Fig. 5).

The rods 79 are arranged and operated so that at their forward limit of movement they are over the assembling conveyer. While in this position, a device is arranged which becomes operative to remove the cut piece and deposit it on the conveyer.

Each of the units 1 to 6 is provided with the delivery rods which are intended to project the severed pieces of fabric over the assembling conveyer, and the means to remove the pieces from several delivery rods are the same for each unit.

Along the center of the assembly belt 7 is arranged a tripper shaft 87 supported at suitable points by brackets 88. Opposite each unit are secured to the shaft 87 a pair of tripper arms 89 in the ends of which are located pins 90. The shaft 87 is arranged to be rocked by a link 91, which is arranged to be operated by any suitable means in timed relation to movement of the delivery rods, the pin 90 dropping behind the several pieces of fabric while the rods are at the outward limit of movement, so that as the rods are withdrawn the piece drops on to the assembly belt. It will be seen that by adjustment of the pins 90 the location of the several pieces of patch material may be accurately fixed.

The rod 91 is arranged to be reciprocated by a cam member 92 on the shaft 23 of the unit 6, the cam striking a roller 93 on the rod.

Figure 7:
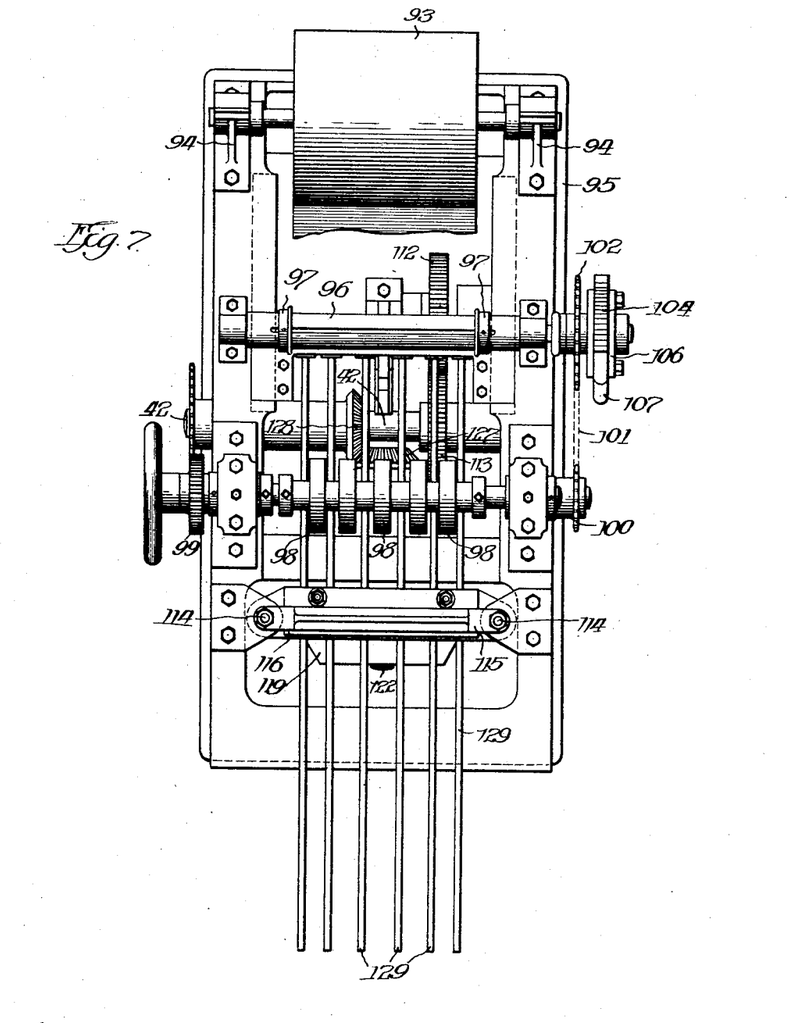
Fig. 7 is a plan view of one of the units for cutting and feeding one of the rectangular elements of the patch.
Figure 8:
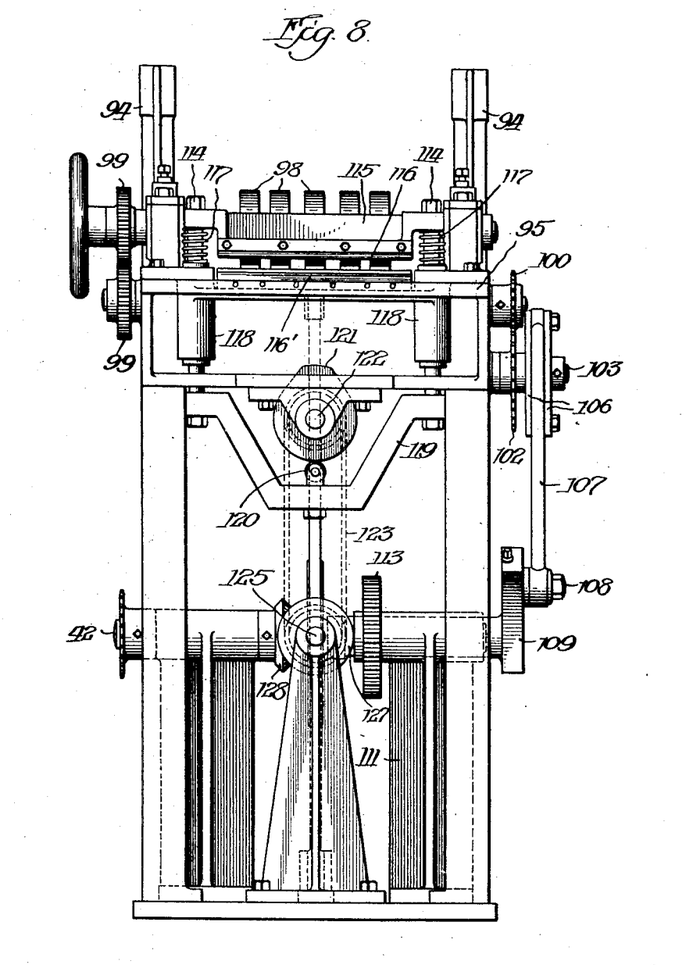
Fig. 8 is a front elevation of same.
Figure 9:
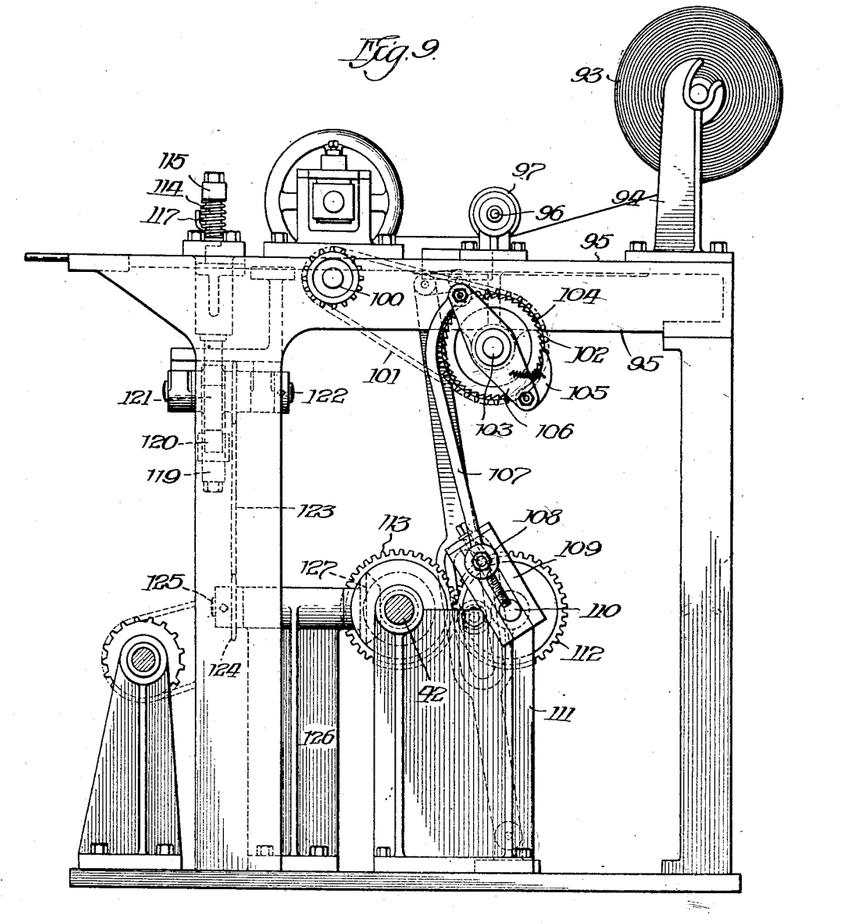
Fig. 9 is a side elevation of the same.

The units 2, 3, 4 and 5, which sever the rectangular pieces of the blow-out patch, are all substantially similar, one only being shown in detail in Figs. 7, 8 and 9.

The fabric in strip form of the proper width is wound in a roll 93 supported on uprights 94 at one end of the table 95. From the roll 93 the fabric is drawn under a shaft 96, which is provided with adjustable collars 97 which center the fabric, by a set of adjustably mounted feeding rollers 98, geared together at 99 and driven by a sprocket 100. This sprocket is driven by a chain 101 passing over a sprocket 102, secured to a shaft 103 suspended from the framework of the unit. A ratchet 104 is formed with the sprocket and arranged to be operated by a pawl 105 carried on a rocking lever 106 attached at one side to the end of a link 107 adjustably and pivotally connected at 108 to a crank arm 109. A shaft 110 is supported by an upright 111, carries the crank, and is rotated by a gear 112 in mesh with a second gear 113 secured to the main shaft 42.

From the forward end of the framework 95 is extended a pair of sliding posts 114, on which is mounted a crosshead 115, the lower end of which carries a die block 116. Across the machine under the die block is secured a die 116' which in these units is a straight knife blade. The cross head is arranged to be supported by a pair of coil springs 117 surrounding the posts. The posts are reciprocated in sleeves 118 and are united across their lower ends by a yoke 119. At the central point the yoke carries a roller 120 contacting a cam 121. A shaft 122 rotates the cam, and is in turn rotated in the proper timed relation to the other moving parts by a sprocket chain 123 passing over a sprocket 124 on the end of a stub shaft 125 rotatably mounted in a bracket 126 rising from the frame of the machine. This shaft is rotated by a bevel pinion 127 in mesh with a bevel gear 128 on the shaft 42.

A set of delivery bars 129 is arranged on each of these units and are operated in a manner similar to that described for the units 1 and 6 and the operation will not be gone into further at this point.

The assembly conveyer is arranged to advance intermittently in the manner shown by Fig. 1 by means of a pawl and ratchet connection 130 from the motor, which drives a sprocket or belt 131, which advances the conveyer. Moving at the same speed as the assembly conveyer is a belt or chain 132 which rotates a series of pairs of pressure rollers 133 between the several units which serve to roll the patch firmly after each successive layer is applied.

Figure 6:
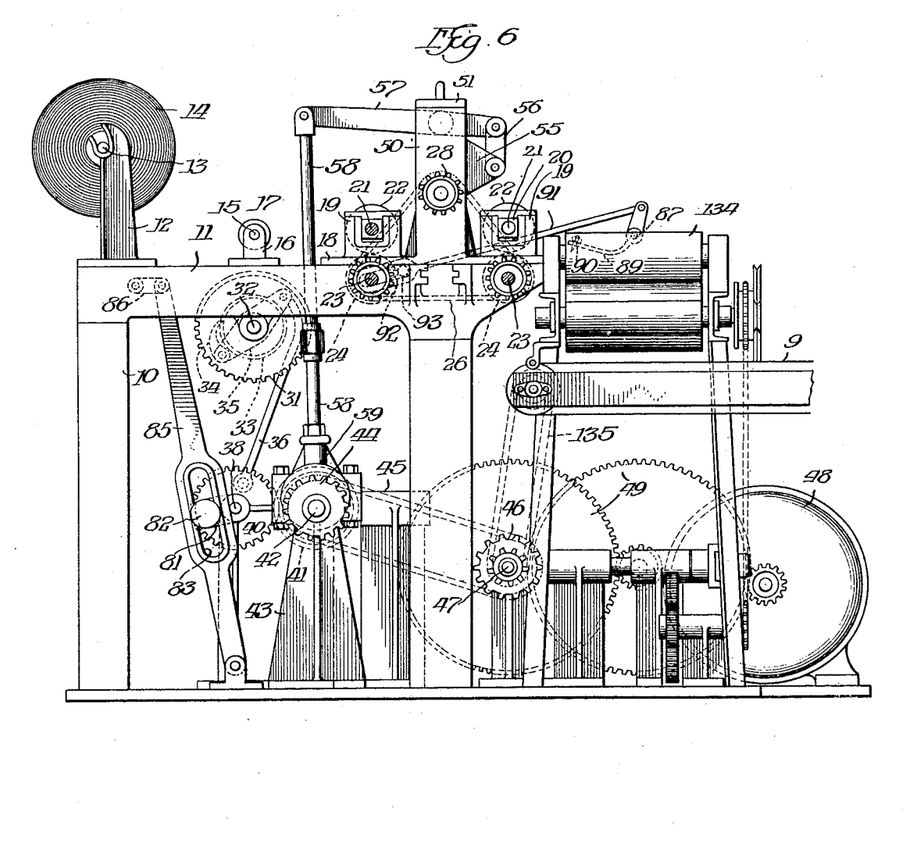
Fig. 6 is an end elevation of the machine.

At the end of the assembly conveyer there is arranged a final squeeze roll 134 which delivers the patches to the delivery conveyer 9, which latter conveyer is driven by a sprocket connection 135 from the shaft 47 (Fig. 6).

The operation of the machine will be readily understood from the description. The several layers are cut by each unit and accurately placed in position on the assembly conveyer by the delivery rods and the tripper mechanism. The patch is rolled and delivered to the presses by the conveyer 9.

While the description of the several parts have been detailed, it is expressly understood that this invention is not limited in its scope to such details, but is entitled to such changes and modifications as may be made within its scope without sacrificing any of its benefits.

I claim:

1. In a machine of the character described, the combination of a plurality of units for severing pieces of material from strips, an assembly conveyer common to the units, and means for conducting the severed pieces from the several units and positioning them on the conveyer.

2. In a machine of the character described, the combination of a plurality of units for severing pieces of material from lengths of fabric, an assembly conveyer passing said units, means for conducting the severed pieces from the several units and placing them on the conveyer, and means for intermittently advancing the conveyer past said units.

3. In a machine for making articles of laminated fabric, the combination of an assembly conveyer, a series of mechanisms for forming separate pieces of material, delivery devices for the said mechanisms, means for moving said conveyer to present the article to the delivery devices so that the pieces will be properly assembled, and a pressure device to compress the article.

4. In a machine for making blow-out patches, the combination of an assembly conveyer, a series of fabric cutting machines, a delivery device for each machine, means to move said conveyer to present the patch to the delivery devices in proper order.

5. In a machine for making blow-out patches, the combination of an assembly conveyer, a series of fabric cutting machines, a delivery device for each machine, means to move said conveyer to present the patch to the delivery devices in proper order, and a pressure device on the conveyer.

6. In a machine for making blow-out patches, the combination of an assembly conveyer, a series of fabric cutting machines, a delivery device for each machine, means to move said conveyer to present the patch to the delivery devices in proper order, and a pressure roller at the end of the assembly conveyer.

7. In a machine for making blow-out patches, a series of fabric cutting machines, one of said machines being designed to cut irregular shaped pieces of fabric, means on said machine to discharge scrap, an assembly conveyer, and a delivery device on said machine delivering thereto.

8. In a machine for making blow-out patches, a series of fabric cutting machines, one of said machines being designed to cut irregular shaped pieces of fabric, means on said machines to discharge scrap, an assembly conveyer and a delivery device on said machine delivering thereto, and a pressure device on the conveyer.

9. In a machine for making blow-out patches, a series of fabric cutting machines, one of said machines being designed to cut irregular shaped pieces of fabric, means on said machines to discharge scrap, an assembly conveyer and a delivery device on said machine delivering thereto, and a pressure roller at the end of the assembly conveyer.

10. In a machine of the character set forth, the combination of means for cutting fabric into irregular pieces of different sizes, means for discharging the scrap, an assembly conveyer and means for delivering the pieces from the cutting means and stacking them on said conveyer.

11. In a machine of the character set forth, the combination of means for feeding fabric from a roll, means for cutting said fabric into irregular pieces, means for discharging the scrap, an assembly conveyer, means for delivering the pieces from the cutting means to said conveyer, and means for accurately positioning said pieces on the conveyer.

12. In a machine of the character set forth, the combination of means for feeding fabric from a roll, means for cutting said fabric into irregular pieces, means for discharging the scrap, an assembly conveyer, means for delivering the pieces from the cutting means to said conveyer, and means for superimposing pieces of material on said first named piece.

13. In a machine of the character set forth, the combination of means for feeding fabric from a roll, means for cutting said fabric into irregular pieces, means for discharging the scrap, an assembly conveyer, means for delivering the pieces from the cutting means to said conveyer, means for accurately positioning said pieces in the conveyer, and means for positioning additional pieces on said first named piece.

14. In a machine of the character set forth, the combination of means for feeding fabric from a roll, means for cutting said fabric into irregular pieces, means for discharging the scrap, an assembly conveyer, means for delivering the pieces from the cutting means to said conveyer, means for superimposing pieces of material on said first named piece, and a compressing roller for said article.

15. In a machine of the character set forth, the combination of means for feeding fabric from a roll, means for cutting said fabric into irregular pieces, means for discharging the scrap, an assembly conveyer, means for delivering the pieces from the cutting means to said conveyer, means for positioning additional pieces on said first named piece, and a compressing roller for the article as it is built up.

16. In a machine of the character set forth, the combination of a fabric supply, feeding mechanism, a die, means coöperating with the die for severing pieces of fabric, a delivery mechanism, a conveyer, and means for removing the cut pieces from said delivery mechanism and stacking them on the conveyer with other cut pieces.

17. In a machine of the character set forth, the combination of a plurality of fabric supplies, feeding devices for said fabric, dies for cutting pieces from said fabric, means for operating the dies, and a mechanism for assembling the pieces from said dies.

18. In a machine of the character set forth, the combination of a fabric supply, an intermittently acting feeding device, a die, means for operating the die between intervals of the fabric feed, a delivery mechanism from said die, an assembly conveyer, and means for removing the cut pieces from the delivery mechanism and placing them in position on the conveyer.

19. In a machine of the character set forth, the combination of a fabric supply, feeding mechanism, a die, means coöperating with the die for severing pieces of fabric, scrap discharge mechanism, means for delivering the cut fabric from the machine and assembling it with other fabric to form a laminated article.

20. In a machine of the character set forth, the combination of a fabric supply, feeding mechanism for advancing the fabric, a die, means for operating the die, a set of delivery rods under the die, means for reciprocating the delivery rods, means for depositing the cut pieces from the rods to the conveyer and assembling it with other cut pieces to form a laminated article.

21. In a machine of the character set forth, the combination of a fabric supply, feeding mechanism for advancing the fabric, a die, means for operating the die, a set of delivery rods under the die, means for reciprocating the rods, a conveyer over which the delivery rods pass at the forward limit of their travel, trippers adapted to pass between the delivery rods to intercept the cut pieces on return movement of the rods and means to assemble the cut pieces on the conveyer with other cut pieces to form a laminated article.

22. In a machine of the character set forth, the combination of a fabric supply, feeding mechanism for advancing the fabric, a die, means for operating the die, a set of delivering rods, means for reciprocating the delivery rods, and trippers adapted to pass between the delivery rods to intercept the cut pieces and remove them from the rods and stack them on other cut pieces.

23. In a machine of the character set forth, the combination of a fabric supply, feeding mechanism for advancing the fabric, a die, means for operating the die, a set of delivery rods, means for reciprocating the delivery rods, trippers adapted to pass between the delivery rods to intercept the cut pieces and remove them from the rods, and means for assembling a plurality of cut pieces to form a laminated structure.

24. In a machine of the character set forth, the combination of a fabric supply, feeding mechanism for advancing the fabric intermittently, an intermittently actuated die, a delivery member under the die, and means for removing the cut pieces from the delivery mechanism, and means for assembling a plurality of cut pieces to form a laminated structure.

25. In a machine of the character set forth, the combination of a strip fabric supply, cutting mechanism adapted to sever pieces of fabric from the strip, a delivery arm, scrap discharge members, and means for assembling a plurality of cut pieces to form a laminated structure.

26. In a machine of the character set forth, the combination of a strip fabric supply, cutting mechanism adapted to sever pieces of fabric from the strip, delivery arms, means for separating the scrap from the pieces of fabric, and means for assembling a plurality of cut pieces to form a laminated structure.

27. A machine for making blow-out patches, comprising a series of units adapted to cut pieces of material of differing sizes, and means for building up the patch from the several pieces delivered by said unit.

28. A machine for making blow-out patches, comprising a pair of units adapted to cut oval shaped pieces of material, a series of units adapted to cut rectangular pieces of material of differing sizes located between the first named units, and means for assembling the piece from all of the units in a symmetrical pile.

29. A machine for making blow-out patches, comprising a pair of units adapted to cut oval shaped pieces of material from a straight strip of fabric, means to discharge the scrap, a series of units adapted to cut rectangular pieces of material of different sizes, located between the first named units and means for assembling the pieces from all of said units in a symmetrical pile.

30. A machine for making blow-out patches, comprising means for cutting out pieces of material of approximately oval shape, means for cutting a plurality of rectangular pieces, and means for assembling the several pieces into a blow-out patch.

31. A machine for making blow-out patches, comprising units for cutting out pieces of material of approximately oval shape, units for cutting out a plurality of rectangular pieces, and means for assembling a blow-out patch from the several pieces with the oval shaped pieces on the top and bottom.

CHARLES W. STEELE.